No. 696,108. Patented Mar. 25, 1902.
C. A. E. RUEBEL.
ELECTRIC GAS LIGHTER.
(Application filed Aug. 9, 1901.)
(No Model.)
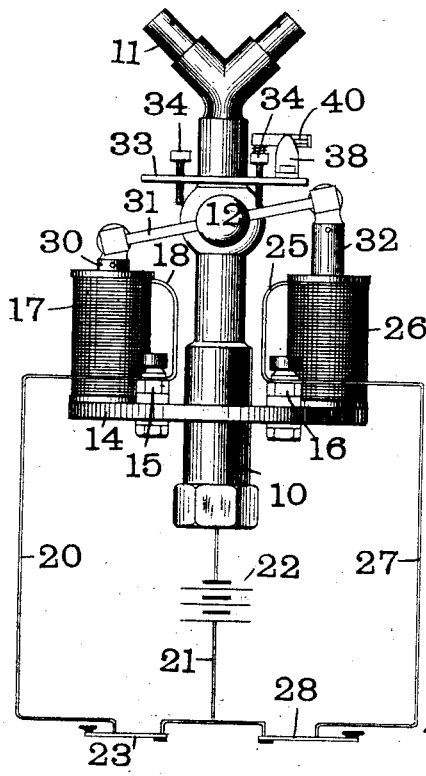
Fig. 1.
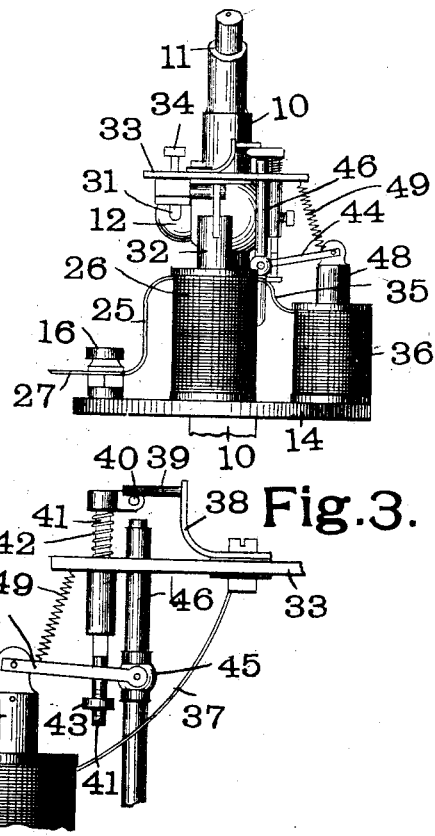
Fig. 2.
Fig. 3.
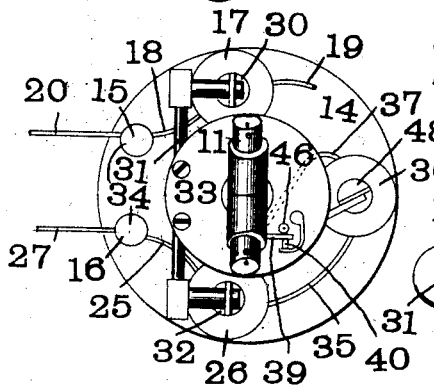
Fig. 4.
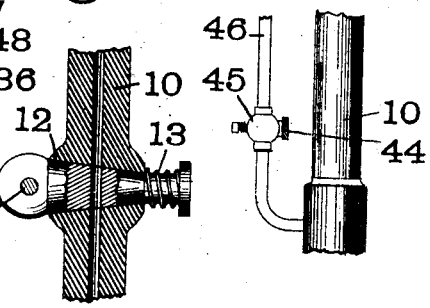
Fig. 5. Fig. 6.
Witnesses
W. A. Alexander
J. R. Watkins
Inventor
C A E. Ruebel
By Attorneys
Fowler & Bryson
THE NORRIS PETERS CO., PHOTO-LITHO., WASHINGTON, D. C.

UNITED STATES PATENT OFFICE.

C. A. ERNST RUEBEL, OF ST. LOUIS, MISSOURI, ASSIGNOR OF ONE-HALF TO E. H. R. GREEN, OF TERRELL, TEXAS.

ELECTRIC GAS-LIGHTER.

SPECIFICATION forming part of Letters Patent No. 696,108, dated March 25, 1902.

Application filed August 9, 1901. Serial No. 71,492. (No model.)

*To all whom it may concern:*

Be it known that I, C. A. ERNST RUEBEL, a citizen of the United States, residing at the city of St. Louis, in the State of Missouri, have invented a certain new and useful Electric Gas-Lighter, of which the following is such a full, clear, and exact description as will enable any one skilled in the art to which it appertains to make and use the same, reference being had to the accompanying drawings, forming part of this specification.

The object of my invention is to construct an electric gas-lighter which will be reliable in operation and the parts of which will be durable and not liable to get out of order.

My invention consists in certain novel features and details of construction, all of which are described in the following specification and pointed out in the claims affixed hereto.

In the accompanying drawings, which illustrate one form of gas-lighter made in accordance with my invention, Figure 1 is a front view. Fig. 2 is a side view. Fig. 3 is an enlarged view showing the sparking device. Fig. 4 is a top plan view. Fig. 5 is an enlarged section showing the valve controlling the main burner, and Fig. 6 is a view showing a detail of construction.

Like marks of reference refer to similar parts in the several views of the drawings.

10 is a pipe or tube which is adapted to be connected with any suitable supply of gas. Secured in the top of the pipe 10 is the main burner 11. The form of burner 11 shown in the drawings is adapted for use with acetylene gas; but any suitable form of burner may be used. The supply of gas to the burner 11 is controlled by means of a plug-valve 12. This valve 12 is preferably conical in form, as shown in Fig. 5, and is held in position by means of a coil-spring 13, so as to make a tight joint.

Carried by the pipe 10 is a circular table 14. On the table 14 are two binding-posts 15 and 16, respectively.

17 is a solenoid which is carried by the table 14 and is connected with the binding-post 15 by means of a wire 18. The opposite end of the solenoid is electrically connected to the table 14 by means of a wire 19, Fig. 4. The binding-post 15 is connected by means of a wire 20 to a return-wire 21, in which is situated a battery 22 or other suitable source of electric supply. In the wire 20 is placed a key 23 for controlling the flow of current through the solenoid 17. The binding-post 16 is connected by means of a wire 25 with a solenoid 26, also carried on the table 14. Leading from the binding-post 16 is a wire 27, which also connects with the return-wire 21. Placed in the wire 27 is a key 28 for controlling the flow of current through the solenoid 26 and another solenoid hereinafter to be described. The movable core 30 of the solenoid 17 is pivoted to one end of a rod 31, which moves the valve 12 controlling the supply of gas to the main burner 11. The opposite end of the rod 31 is pivoted to the movable core 32 of the solenoid 26. Carried on the pipe 10 above the valve 12 is a disk 33, mounted on which are two set-screws 34, which limit the movement of the rod 31, and thus control the opening of the valve 12. Leading from the solenoid 26 is a wire 35, which is connected to a solenoid 36. The opposite end of the solenoid 36 is connected by means of a wire 37 with an arm 38, carried on the disk 33, but insulated therefrom. Carried by the arm 38 is a platinum pin 39. The pin 39 makes contact with a second platinum pin 40, carried by a vertically-movable rod 41. The pin 40 is held in contact with the pin 39 by means of a coil-spring 42, which is placed around the rod 41 above the disk 33. On the lower end of the rod 41 is an adjustable nut 43, which is adapted to engage with an arm 44. The arm 44 controls a valve 45, similar to the valve 12, above described. The valve 45 is situated in a by-pass 46, which leads from the main pipe 10. The top of the by-pass 46 terminates near the pins 39 and 40 and is adapted to form a secondary burner for igniting the main burner 11. The opposite end of the arm 44 is pivoted to the movable core 48 of the solenoid 36. The core 48 is normally held in a raised position by means of a spring 49, attached at one end to the arm 44 and at the other to the disk 33.

The operation of my device is as follows: When the parts are in the position shown in Fig. 1, the supply of gas is cut off from both the main and auxiliary burners. By closing the key 28 the current from the battery 22 passes through the wires 21 27 25 to the solenoid 26 and draws down the core 32. The movement of the core 32 is communicated by the rod 31 to the valve 12, thus opening the said valve and allowing the gas to pass to the main burner 11. At the same time the current passes on through the wire 35 to the solenoid 36, thus drawing down its core 48 and opening the valve 45, thus allowing the gas to escape through the auxiliary burner 46. As soon as the arm 44 comes in contact with the adjustable nut 43 the pin 40 will be drawn away from the pin 39, thus causing a spark between the said pins and at the same time breaking the circuit. The spring 49 will now draw the arm 44 and core 48 upward until the pins begin to come in contact. Sparks will thus continue to pass between the pins 39 and 40 until the gas escaping from the auxiliary burner 46 is lighted. The flame from this auxiliary burner 46 will ignite the gas escaping from the main burner 11. As soon as the burner 11 is lighted the circuit through the wire 27 can be broken by means of the key 28. The spring 49 will then draw the core 48 to its highest position and shut off the supply of gas through the auxiliary burner 46. The valve 12 of the main burner will remain in its open position until it is desired to extinguish the light, when the circuit is closed through the wire 20 by means of the key 23. This will cause the solenoid 17 to draw the core 30 downward, thus closing the main valve 12.

It will be seen that it is only necessary to pass the current through the lighter at the times when it is either desired to light or to extinguish the burner and that the parts are simple of construction and not liable to get out of order. By using the auxiliary burner 46 the sparking contacts 39 and 40 are only momentarily subjected to the action of the flame from the auxiliary burner 46, and hence are not injured as they would be if they were placed in such position as to directly light the main burner 11.

Having fully described my invention, what I claim as new, and desire to secure by Letters Patent of the United States, is—

1. In an electric gas-lighting device, the combination with a main burner, of an auxiliary burner, a valve for said main burner, an electromagnet for opening said valve, a valve in said auxiliary burner, a second electromagnet for operating said auxiliary valve, and a sparking device for said auxiliary burner controlled by said second electromagnet.

2. In an electric gas-lighting device, the combination with a main burner, of an auxiliary burner, a valve for said main burner, an electromagnet for opening said valve, a valve for said auxiliary burner, a second electromagnet for controlling said valve, and a third electromagnet for closing said main valve.

3. In an electric gas-lighting device, the combination with a main burner, of an auxiliary burner, a valve for said main burner, an electromagnet for opening said valve, a valve for said auxiliary burner, a second electromagnet for operating said auxiliary valve, both said valves being in the same circuit, and a sparking device for said auxiliary burner controlled by said second electromagnet.

4. In an electric gas-lighting device, the combination with a main burner, of an auxiliary burner, a valve for said main burner, an electromagnet for opening said valve, a valve for said auxiliary burner, a second electromagnet for controlling said valve, both said electromagnets being in the same circuit, and a third electromagnet for closing said main valve.

5. In an electric gas-lighting device, the combination with a main burner, of an auxiliary burner, a valve for said main burner, an electromagnet for opening said valve, a valve for said auxiliary burner, a second electromagnet controlling said auxiliary valve, a sparking device arranged adjacent to said auxiliary burner and controlled by said second electromagnet, and a third electromagnet for closing said main valve.

6. In an electric gas-lighting device, the combination with a main burner, of an auxiliary burner for lighting said main burner, a valve for said main burner, an electromagnet for closing said valve, a second electromagnet for opening said valve, a valve for said auxiliary burner, an electromagnet for operating said valve, a spring normally closing said latter valve, and a sparking device for said auxiliary burner controlled by said latter-named electromagnet.

7. In an electric gas-lighting device, the combination with a main burner, of a rocking valve therefor, an auxiliary burner, a valve for said auxiliary burner, an electromagnet for closing said main valve, a second electromagnet for opening said main valve, a third electromagnet for operating said auxiliary valve, said second and third magnets being connected in series, a sparking device for said auxiliary burner, and means controlled by the movement of said third electromagnet for operating said sparking device.

In testimony whereof I have hereunto set my hand and affixed my seal in the presence of the two subscribing witnesses.

C. A. ERNST RUEBEL. [L. S.]

Witnesses:
GEO. E. WELLS,
WM. T. JONES.